Aug. 19, 1941.            S. GREVAS            2,252,972

FUEL HEATING ATTACHMENT

Filed Aug. 23, 1939

INVENTOR:
STEVE GREVAS
BY *H. M. Plaisted,*
ATTORNEY.

Patented Aug. 19, 1941

2,252,972

UNITED STATES PATENT OFFICE 2,252,972

FUEL HEATING ATTACHMENT

Steve Grevas, Nameoki, Ill.

Application August 23, 1939, Serial No. 291,493

1 Claim. (Cl. 123—122)

This invention relates to certain new and useful improvements in gas fuel heating attachment for automobile engines the peculiarities of which will be hereinafter fully described and claimed.

The main object of my invention is to provide means to improve the generated gasoline vapor from the carburetor so as to increase its expansive force of combustion in the cylinders and increase the mileage per quart of gasoline fuel; and second, to regulate the temperature of the heated air to obtain the best mileage from the car to which it is applied, and according to the atmospheric temperature in summer or winter. Other objects and improved construction will be hereinafter described in the specification and particularly pointed out in the claim.

Figure 1:
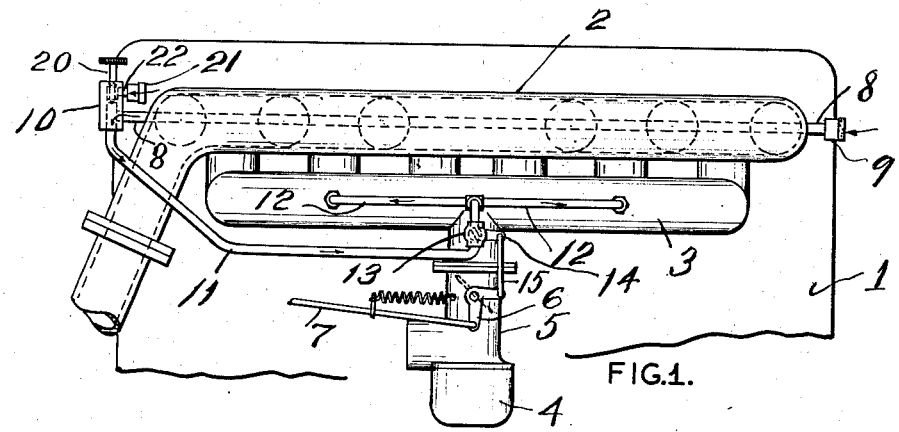
Figure 2:
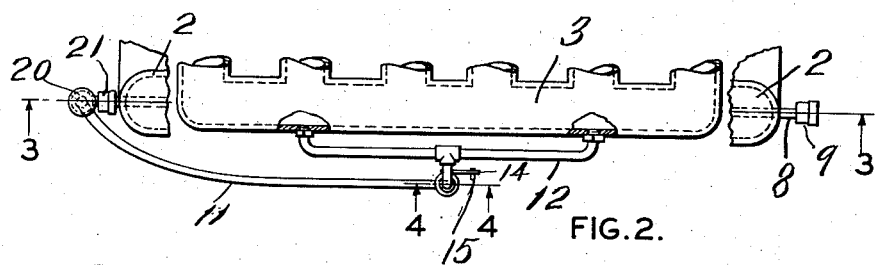
Figure 3:
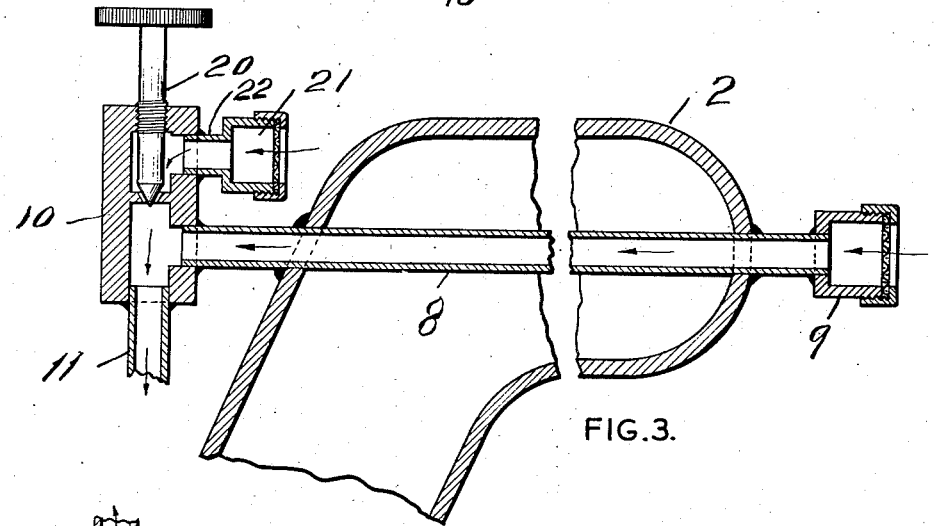
Figure 4:
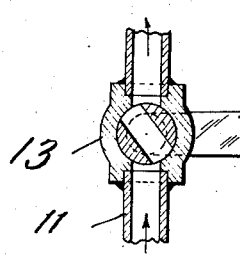

In the accompanying drawing in which like reference numerals indicate corresponding parts, Fig. 1 represents a side view of a portion of an engine block with an exhaust manifold and an intake manifold, and my improvements applied thereto and cooperating therewith;

Fig. 2, a plan view of a portion of the intake manifold shown in Fig. 1, the exhaust manifold being partly broken away to show the intake manifold, and my improvements connecting the same;

Fig. 3, an enlarged vertical section on the line 3—3 of Fig. 2 of a part of the exhaust manifold, my air heating pipe passing through it, and my auxiliary air intake regulating valve attached to said pipe; and Fig. 4, a vertical section on a larger scale of the inlet valve admitting the modified air to the intake manifold and its operative link for connection to the foot-controlled throttle valve for admission of the gasoline vapor from the carburetor.

Referring to the drawing the numeral 1 designates a part of the engine block of an automobile or other combustion engine having an exhaust manifold 2, and an intake manifold 3 supplied with gasoline vapor from a carburetor 4 through a connecting pipe 5 having a throttle valve operated by a bell crank lever 6, to one arm of which is connected a spring-controlled rod 7 connected in the usual manner to a foot pedal (not shown).

My improvements comprise a pipe 8 mounted in the exhaust manifold or otherwise next thereto to be heated thereby, and having a screened inlet 9 at one end for admission of atmospheric air. This pipe 8 preferably passes through the exhaust manifold and out at the opposite end as shown in Figs. 1 and 3, and communicates by said opposite end with a pipe connection such as a T 10 to one end of which is connected a pipe 11 extending toward the intake manifold where it is provided with a double branched pipe 12 communicating with the intake manifold as shown in Figs. 1 and 2. Adjacent the branch pipe the communicating pipe 11 is provided with a rotary regulating valve 13 having an arm 14 by which the air heated in the pipe 8 is regulated in its admission to the intake manifold through the branch 12, by means of a link 15 connecting the arm 14 to the other arm of the bell crank lever 6, so that operating the throttle valve through the rod 7 will simultaneously operate the rotary regulating valve 13.

I have demonstrated in practice by the admission of this heated air to the intake manifold as above described, that the regular gasoline mixture from the carburetor is changed to a spray with increased effect of combustion in the cylinders. I have demonstrated by actual practice that such gasoline spray formed by said mixture of heated air obtains a mileage of $5\tfrac{8}{10}$ miles per quart of fuel. In the machine to which the above described improvements were applied, I was able to obtain only 4 miles per quart before my improvements were applied thereto; thus an increase in mileage of $1\tfrac{8}{10}$ miles per quart was shown by said demonstration on such machine.

Furthermore, I have demonstrated by actual practice that by modifying the temperature of the air heated in the pipe 8, I can yet further increase the mileage. Such modified temperature I obtained by admission of atmospheric air through a needle valve 20 controlling an auxiliary air inlet that is mounted on the other end of the T 10 before mentioned. Atmospheric air is admitted by this T valve through a screened opening 21 and nipple 22 mounted on the T connection as shown in Fig. 3. This needle valve is manipulated so as to regulate the amount of atmospheric air to be mixed in said T with the heated air entering the T from the pipe 8, by which admixture of cooler air the best modified temperature of the air passing through the connecting pipe 11 is obtained according to the style of car and the temperature of the atmospheric air depending on the time of the year. It appears that the air heated in the pipe 8 is raised to a higher temperature than will afford the best result in increased mileage when supplied to the intake manifold by the branch pipe 12, than can be obtained when such high temperature of the air is modified by admission of atmospheric air to the pipe 8 after it has passed through the exhaust manifold. I have demonstrated by careful and repeated practice that I can obtain $6\frac{3}{10}$ miles per quart of gasoline by this modified temperature of the heated air acting upon the regular gasoline mixture from the carburetor of the car used. As before stated, I obtain $5\frac{8}{10}$ miles per quart by the use of all hot air from the pipe 8 then in the use of the regular gasoline vapor, but the mixture was further improved by modifying the temperature of this heated air so that I obtained $6\frac{3}{10}$ miles per quart of gasoline and thus obtained an increase mileage over the use of the highly heated hot air. I cannot state the most efficient temperature of the modified air supplied through the branch pipes by my construction as it was obtained by experimental adjustment of the valve controlling the auxiliary air inlet 21, but such mileage of $6\frac{3}{10}$ miles per quart of gasoline was obtained in repeated demonstrations so that there was an increase of $2\frac{3}{10}$ miles per quart over the mileage obtained by my automobile before my improvements were applied thereto. It is to be noted that the inlets to the pipe 8 are remote from each other and beyond the heated area of said pipe and one of the inlets is controllable to close off the same, while the other inlet is permanently open to the atmosphere.

I have therefore demonstrated in actual practice that my construction provides means for greatly improving generated gasoline, and I have obtained improved mileage over that previously obtained with the same machine prior to my improvements applied thereto.

By the construction above described I have been able to regulate the temperature of the modifying air and improve the generation of gasoline spray from the regular mixture supplied by the ordinary carburetor, and I lay claims to such improved construction by the appended claim.

I claim:

In an attachment of the kind described, a straight tubular heated conduit having a screened inlet at one end, a needle valved casing at the other end of said conduit in substantially the same plane with its screened inlet, and having a screened inlet and a discharge, and a needle valve adjustable in the casing for positive closing of the inlet therein.

STEVE GREVAS.